Sept. 15, 1959     S. PENNELLA     2,904,315
PACKING MEANS FOR THE TUBE JOINTS IN SURFACE CONDENSERS
Filed Jan. 4, 1957
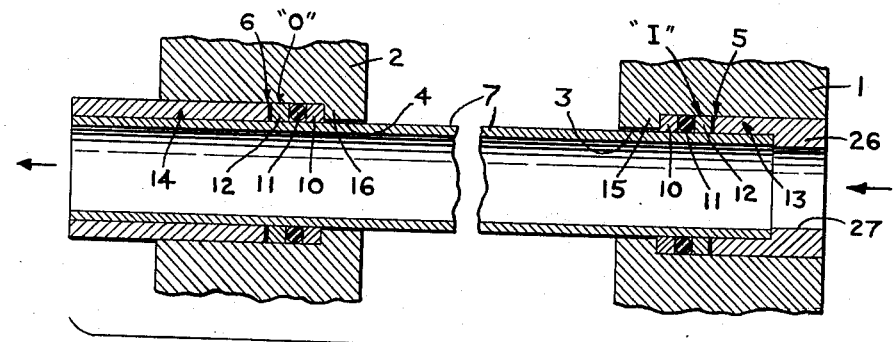
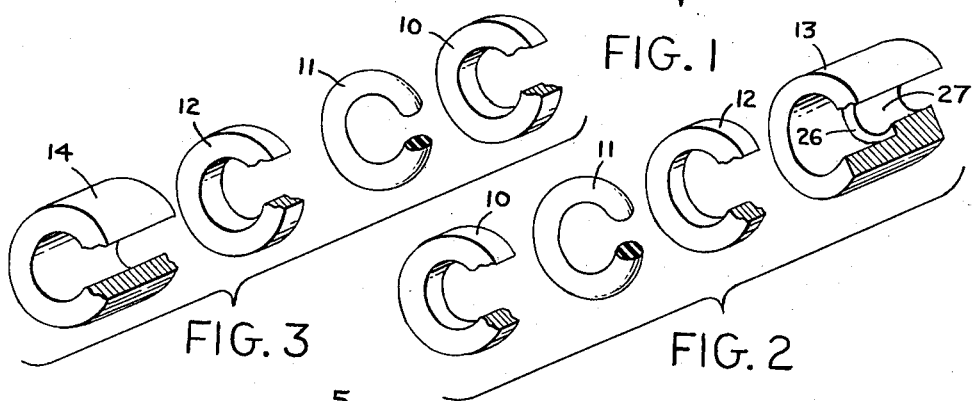
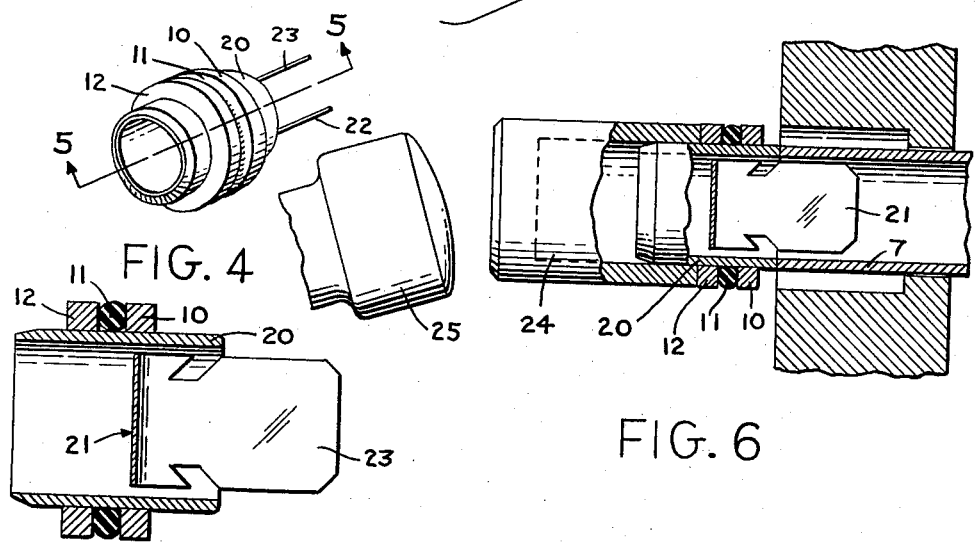
SAMUEL PENNELLA
INVENTOR.
BY Daniel H. Bobis
atty United States Patent Office 2,904,315
Patented Sept. 15, 1959

2,904,315
PACKING MEANS FOR THE TUBE JOINTS IN SURFACE CONDENSERS

Samuel Pennella, Pompton Lakes, N.J.

Application January 4, 1957, Serial No. 632,592

6 Claims. (Cl. 257—43)

This invention relates generally to non-contacting type heat exchangers and more particularly to a packing means for the tubes of such heat exchangers, easily and inexpensively installed and which will not only prevent or seal against leakage of fluid between the tube and the tube joint but will simultaneously hold the tube ends from flexure while allowing at least one end to expand longitudinally with thermal changes in the condenser, center the tube in the tube sheet, insulate the tube from potential galvanic action which might occur during operation, and act as a strainer for foreign material admitted with the fluid to be passed through the tubes.

In heat exchangers of the non-contacting type such as surface condensers used for condensing exhausting steam in power plants, it is essential to the efficient operation of these condensers that there be no leakage of fluid through the tube joints in the tube sheets of such condensers. In addition, where such condensers are used in pressure water reactor systems it is absolutely necessary for safe operation that no leakage occur because of the deleterious effect that radioactive particles would have in the steam condensate.

It is well known practice in condenser construction to seal the water circulating tubes at the tube heads to provide fluid tight connections either by rolling the ends of the tubes, by welding the tubes to the tube sheet or by employing a combination of packing and ferrules threaded into the tube sheets.

The rolling or welding of the tube ends frequently causes local crystallization of the tubes resulting in relatively quick deterioration of the tubes and consequent expense for retubing, both as to labor cost and tube loss.

With the threaded ferrule type mounting, one form of which is shown in my early Patent 2,298,154, issued October 6, 1942, it is necessary to thread both the tube sheets and the ferrules and hence this becomes an expensive operation, not only due to the number of tubes in each condenser but the additional labor costs both in threading the tube sheets and ferrules and the installation of these ferrules into the tube sheets.

In my prior Patent 2,729,472, a packing means was disclosed in which rolling, welding or threaded ferrules and tube sheets were eliminated. The present invention is an improvement over this patent.

The present invention overcomes the problem by providing a packing structure or combination of elements for mounting the respective ends of the tubes in the tube sheets which includes sealing and centering elements and an insulating element coacting with these sealing and centering elements which elements are so seated about the tubes in the counterbores provided in the tube heads that the tubes are held in fluid tight relationship with the tube sheet and, further, are centered in the tube openings, are insulated against galvanic action, and the inlet end packing can be so modified as to act as a strainer while the outlet end can be so constructed as to allow for longitudinal expansion of the tubes with thermal changes in the condenser, the entire assembly also being adapted for easy repair where the condenser is constructed and arranged in accordance with the invention disclosed in my Patent 2,298,154.

Accordingly, it is an object of the present invention to provide a simple, relatively inexpensive, quickly installed packing combination by means of which condenser tubes may be sealed in tight combination with condenser tube sheets.

It is another object of the present invention to provide a packing combination by means of which the condenser tubes will be simultaneously centered in position in the condenser tube sheet insulated from potential galvanic action with the tube sheet, and positioned to allow longitudinal expansion relative to the condenser tube sheet with thermal changes in the condenser without causing undue flexure of the tube ends relative to the condenser tube sheets in which they are held.

It is a still further object of the present invention to provide a packing combination such that the packing will operate to strain out any foreign matter which might become lodged in the tubes as the fluid flows through.

Further objects and advantages of the invention will become evident from the following description with reference to the accompanying drawings in which:

Figure 1 is a fragmentary section through a part of a condenser showing the improved packing applied thereto.

Figure 2 is an exploded perspective view of the packing for the inlet end of a tube joint.

Figure 3 is an exploded perspective view of the packing for the outlet end of a tube joint.

Figure 4 is a perspective view of a carrier unit with the sealing elements of the packing thereon.

Figure 5 is a longitudinal section taken on 5—5 of Figure 4.

Figure 6 is a view partially in section illustrating the means of applying the packing to the tube joint of the condenser.

Figure 1, the fragmentary section through a part of a condenser shows the inlet end tube sheet 1 and outlet end tube sheet 2. The tube sheets 1 and 2 are each drilled to provide aligning tube receiving openings 3 and 4 which are in turn counterbored to provide the counterbores 5 and 6.

A condenser tube 7 is disposed through the openings 3 and 4 in the respective tube sheets 1 and 2 and fluid tight joints are formed between this tube and the tube sheets by the packing assemblies generally designated I and O for the respective inlet ends and outlet ends of the tube 7. It will be understood that while only one condenser tube is shown that it is well known that a tube sheet contains a plurality of such condenser tubes. The reason only one condenser tube is shown is for the purpose of clearly illustrating the present invention but it is understood that each of the packings indicated would be applicable to each of the condenser tubes in the tube sheet.

Packing assemblies

The packing assemblies I and O are shown in Figures 2 and 3 respectively, and as indicated at both the inlet end of the condenser tube and the outlet end of the condenser tube they are each composed of four annular elements, three of these annular elements designated 10, 11 and 12 are identical, functioning identically at each end of the condenser tube, namely, to create the water tight seal at the tube joint and to center the tube in the openings 3 and 4 provided in the tube sheets 1 and 2.

The fourth element 13 in the inlet end packing assembly I differs from the fourth element 14 in the outlet end packing assembly O because while both elements operate to insulate the tube 7 from galvanic or electrochemical action with the respective tube sheets 1 and 2, the element 13 in the inlet end packing assembly also operates as a strainer to prevent bits of coke and other foreign matter from entering the tube 7 as is hereinafter described.

The annular sealing and centering elements 10, 11 and 12 differ from each other. Thus, element 10 is composed of a hard, non-frangible fiber-like material such as Micarta, manufactured by the Westinghouse Electric & Mfg. Co. or similar material which will not swell when wetted. Element 11 is a conventional O-ring which may be made of either true or synthetic rubber and element 12 is preferably made of a highly compressed fiber or the like type of material which will swell and expand when wetted.

As shown in Figure 1, these elements are mounted about the tube 7 in the respective counterbores 5 and 6 of the inlet and outlet tube sheets 1 and 2 so that the elements 10 are brought into abutting relation with the shoulders 15 and 16 formed by the counterbores 5 and 6 and the respective tube openings 3 and 4.

These elements are positioned relative the tube 7 and counterbores 5 and 6 by means of a packing carrier sleeve 20, of the type described and claimed in my prior Patent 2,521,186, the elements 10, 11 and 12 being mounted on the carrier sleeve 20 as shown in Figure 4 of the drawings.

Thus, as shown in Figures 4, 5 and 6, the carrier sleeve 20 is a hollow cylindrical member with an external diameter equal to the outer diameter of the condenser tube about which the elements 10, 11 and 12 are to be mounted. The outside diameter of the carrier sleeve 20 is also of such size that the annular elements 10, 11 and 12 will fit with sufficient frictional engagement to retain the packing firmly in place upon the carrier sleeve 20 but permit it to be driven off the sleeve 20 about the tube 7 and into the counterbores 5 and 6 of the respective tube sheets 1 and 2.

A U-shaped spring gripping member 21 has its base end inserted into one end of the sleeve 20 so that the spaced spring legs 22 and 23 of the spring gripping member will project out of the carrier sleeve 20 as is clearly shown in Figures 4 and 5 of the drawings.

In applying the annular elements 10, 11 and 12 to the condenser tube the carrier sleeve 20 is positioned as shown in Figure 6 with the spring legs 22 and 23 engaging the inner wall of the condenser tube 7 until the carrier sleeve 20 is brought into abutment with whichever end the members are to be mounted about. Then if a counterbored mandrel, generally designated 24, is placed about the end of the carrier sleeve 20 and struck with a hammer 25 as shown in Figure 6 of the drawing the elements 10, 11 and 12 will be driven off the carrier sleeve 20 and onto the end of the condenser tube within the counterbore of the specific tube sheet being fitted. Further blows with a hammer 25 may be struck to firmly position the elements 10, 11 and 12 in the counterbores 5 or 6 in the abutting relationship above described.

The act of setting the annular elements 10, 11 and 12 with additional blows of the hammer causes a slight distortion of the element 12 because of the fibrous material of which it is composed. This action operates to form the inital seal and after the element 12 is wetted it will swell, and by coaction with the O-ring form a permanent fluid tight seal between the tube and the respective tube sheet 1 or 2, whichever end is being positioned at the time. In addition, this element 12 acts to lock the elements 10 and 11 in their respective positions and thus element 10 is prevented from cocking or moving out of position and thus will continue to operate to center the tube element 7 in the tube opening and the counterbore of the respective tube sheets.

*Insulating elements of packing assemblies*

The annular insulating elements 13 and 14 are composed of the same or substantially the same material as the annular elements 10.

The element 14 used at the outlet end of the tube sheet 2 is a hollow cylindrical member of uniform internal and external diameter. The internal diameter and external diameter of the element 14 will be such that it will frictionally engage the outer surface of the condenser tube and the inner surface of the counterbore 6.

After the sealing and centering elements 10, 11 and 12 have been positioned as above described, the element 14 by the exertion of a slight amount of force through the use of the mandrel and hammer above indicated may be driven into tight-fit engagement with the tube and counterbore. When in this position, in addition to insulating the tube the element 14 will act to hold the tube in its centered position and, in effect, provides a coacting relationship with the element 10 of the packing assembly O. While the insulating element 14 is tapped firmly into position as shown in Figure 1 of the drawings, it does not abut the element 12 but is a spaced distance therefrom to allow room for expansion of the element 12 in assembled position when it is wetted. In addition, it is clear that the end of the tube 7 extends past the member 14 and thus while it is held tightly in the tube sheet this end of the tube 7 is adapted to expand longitudinally relative the member 14 and the remaining portions of the packing assembly.

The annular element 13 at the inlet end of the tube sheet 1 differs in construction because of its additional straining function. Thus, Figures 1 and 2 show that while element 13 is also a hollow cylindrical member, it only has a uniform internal and external diameter for that portion of its length which as hereinafter described is adapted to fit about the condenser tube 7 at the inlet end thereof and into the counterbore 5 of the inlet end tube sheet 1. On the remaining portion, a shoulder generally designated 26 is formed by an internally disposed annular section which forms an opening 27 coincident with the opening of the condenser tube 7 when in assembled position as shown in Figure 1. This opening, however, will have a diameter approximately .0015″ less than the internal diameter of the condenser tube 7. The portion of the element 13 having a uniform internal and external diameter is the same as that above described for the element 14 and thus, after the sealing and centering elements 10, 11 and 12 have been positioned about the tube 7 in the counterbore 5 for the inlet end tube sheet 1 the element 13 may be manually positioned about the tube 7 by means of a mandrel and hammer as shown in Figure 6 until the shoulder element 26 is brought into abutment with the end of the condenser tube. Once again the element 13 is not brought into abutting relation with the fiber element 10 so as to allow this member to expand when in operative position.

In assembled position, the element 13 acts as both an insulating member and coacts with the member 10 as in the case of insulating member 14 and due to the reduced diameter of the opening 24 will act as a strainer for any small coke chips or foreign matter which might be brought in with the fluid being passed through the condenser tube 7.

Since the element 13 has an inturned annular lip 28, in assembled position it constrains the condenser tube 7 from expanding and contracting under thermal stress. However, this is not the case at the outlet end as has been above mentioned and thus the entire tube is free to expand and contract by slidable movement relative to the packing assembly O without affecting the fluid tight seal of the respective tube joints at the inlet end and outlet end tube sheets 1 and 2. Nor are the insulating and centering qualities of the packing assemblies O or I affected.

Furthermore, while the packing assemblies I and O allow for the longitudinal expansion and contraction of the tube relative the tube sheets, they make sufficiently firm contact that the tube ends adjacent the tube sheets do not become subject to undue flexure during operation of the condenser.

It will be understood that the invention is not to be limited to the specific construction or arrangement of parts shown but that they may be widely modified within the invention defined by the claims.

What is claimed is:

1. In a surface condenser the combination of spaced tube sheets having tube end receiving openings therein, and tubes extending from one tube sheet to the other and mounted in aligned openings in the respective tube sheets, each of said tube receiving openings being counterbored from the outer face of the tube sheet, fluid tight means for each of said tubes mounted in the respective counterbores of one of said tube sheets for fixedly holding the end of each of said tubes in the respective tube sheet, fluid tight packing assemblies for each of said tubes mounted in the aligned counterbore remote from said fixed end to permit sliding movement of said end of the tube remote from the fixed end and including, a first annular element of hard non-frangible material for centering said tube in said tube end receiving opening, an O-ring, and a second annular element of compressed material which will swell when wetted and an insulating ring about each tube and in said counterbores, said insulating ring disposed outwardly of said second annular element and spaced therefrom to coact with said first annular element for centering the tubes in said tube end receiving opening and to insulate said tube from galvanic action.

2. In a surface condenser the combination of spaced tube sheets having tube end receiving openings therein, and tubes extending from one tube sheet to the other and mounted in aligned openings in the respective tube sheets, each of said tube receiving openings being counterbored from the outer face of the tube sheet, fluid tight means for each of said tubes mounted in the respective counterbore of one of said tube sheets for fixedly holding the end of said tube in its respective tube sheet including a first annular element of hard non-frangible material for centering said tube in its tube end receiving opening, an O-ring, and a second annular element of compressed material which will swell when wetted, and an insulating ring about each tube and in said counterbore, said insulating ring disposed outwardly of said second annular element and spaced to coact with said first annular element for holding and centering the tubes in said tube end receiving opening and to insulate said tube from galvanic action, and fluid tight packing assemblies for each of said tubes in the aligned counterbores remote from said fixed end to permit sliding movement of the end of said tube remote from the fixed end.

3. In a surface condenser the combination of spaced tube sheets having tube end receiving openings therein, and tubes extending from one tube sheet to the other and mounted in aligned openings in the receiving tube sheets, each of said tube receiving openings being counterbored from the outer face of the tube sheet, fluid tight means for each of said tubes mounted in the respective counterbore of one of said tube sheets for fixedly holding one end of said tubes in this tube sheet, fluid tight packing assemblies for each of said tubes in the aligned counterbore opposite from the fixed end to permit sliding movement of the end of the tube remote from the fixed end, said fluid tight means and said packing assemblies each including a first annular element of hard non-frangible material for centering said tube in said tube receiving opening, an O-ring, and a second annular element of compressed material which will swell when wetted, and an insulating ring about each tube end and in said counterbores, said insulating rings disposed outwardly of the respective second annular elements of said fluid tight means and said packing assemblies and spaced therefrom to coact with the respective first annular elements for holding and centering the tubes in said tube end receiving openings and to insulate said tubes from galvanic action.

4. The combination as claimed in claim 3 wherein said insulating member for the packing assembly is an element having a friction fit with the tube surface and the inner surface of each counterbore.

5. The combination as claimed in claim 3 wherein the insulating element for the packing assembly has a friction fit with the tube surface and inner surface of each counterbore and is disposed about each tube inwardly of the end of the tube to allow said tube freedom of longitudinal expansion under thermal changes during operation of the condenser.

6. The combination as claimed in claim 3 wherein the insulating element for the fluid tight means extends about the inlet end of said tubes and has an opening therethrough in alignment with the tube opening, said opening in the insulating element having a diameter slightly less than the internal diameter of the tube about which it is mounted to strain out foreign material in the fluid being passed through said tubes.

References Cited in the file of this patent

UNITED STATES PATENTS

| | | | |
|---|---|---|---|
| 2,298,154 | Pennella | Oct. 6, | 1942 |
| 2,394,402 | Pennella | Feb. 5, | 1946 |
| 2,427,789 | Kehle | Sept. 23, | 1947 |
| 2,521,186 | Pennella | Sept. 5, | 1950 |
| 2,729,472 | Pennella | Jan. 3, | 1956 |